Figure 1:
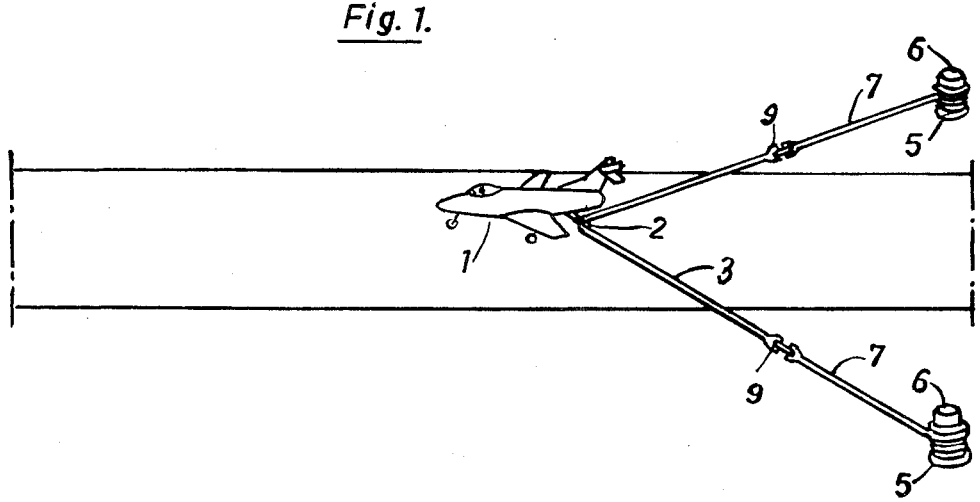

United States Patent [19]
Fonden et al.

[11] 3,724,787
[45] Apr. 3, 1973

[54] LINE OR BAND FOR ARRESTING AIRCRAFT

[75] Inventors: Per Borje Fonden; Karl Ove T. Walander, both of Linkoping, Sweden

[73] Assignee: Borgs Fabriks AB, Norrkoping, Sweden

[22] Filed: May 21, 1971

[21] Appl. No.: 145,702

[30] Foreign Application Priority Data

May 22, 1970 Sweden .....................................7037

[52] U.S. Cl. ............................................244/110 A
[51] Int. Cl. ...............................................B64f 1/02
[58] Field of Search.........244/110 A, 110 R; 188/1 B

[56] References Cited

UNITED STATES PATENTS

| 3,392,939 | 7/1968 | Cruger et al.......................244/110 A |
| 3,353,768 | 11/1967 | Peterson............................244/110 A |

Primary Examiner—Milton Buchler
Assistant Examiner—Paul E. Sauberer
Attorney—Munson & Fiddler

[57] ABSTRACT

An aircraft arresting apparatus having a line, band or cable for engagement by a landing aircraft, the line, band or cable being composed of a plurality of lengths or sections of different tensile strength, the lengths being suitably united or joined together in endwise relationship.

3 Claims, 2 Drawing Figures

LINE OR BAND FOR ARRESTING AIRCRAFT

BACKGROUND OF THE INVENTION

In designing arresting devices for aircraft, efforts should be made to provide such devices with as high a performance level as possible. Limiting factors in this respect are the maximum forces which the arresting device can exert on the aircraft, depending on the strength of the aircraft hook, for example, with which aircraft are often provided in order to use devices of this kind.

At the comparatively high speeds at which it should be possible to arrest the aircraft, two phases can be distinguished. From the moment that the aircraft makes contact with the arresting device a series of rapid load surges pass through it and out to the lines, cables or band, hereafter called the braking lines, that are wound on the braking drums. The above mentioned load surges produce a highly dynamic pattern of loading. Only a small portion of the loads arising during this dynamic or kinetic energy absorbing phase is due to inertia in the brakes, the major portion being chiefly governed by the design and mass of the arresting device and the speed of the aircraft, the point of arrest and any deviation from a right-angle run-in relative to the arresting device.

Later, but still under strongly varying loads in the lines, the main acceleration of the line drums to maximum speed takes place. The inertia of the brakes will greatly influence the magnitude of the loads while the design and mass of the arresting device is of lesser significance.

To provide for adjustment of the load level in the lines during this phase, designers have very little option but to give the line system suitable elastic properties. In order to retain reasonable freedom of design in this, major efforts have been made to reduce the mass of the brakes and the arresting lines as much as possible. These two initial phases following rapidly one upon the other may be jointly called the dynamic or kinetic energy absorbing phase.

Local surges gradually decrease and the forces in the system will be primarily determined by the braking effort exerted. As distinct from the first dynamic phase, this phase may be called the static or potential energy phase.

For geometrical reasons, the loads in the line will only, to a limited extent, be transferred to the hook during the dynamic or kinetic energy absorbing phase when the angle made by the line at the hook is still relatively large. During the subsequent static phase, this angle will be smaller and the load on the hook will closely correspond to the sum of the loads in the two lines extending from the hook to the brakes.

In order to obtain maximum performance within the given durability limitations of the aircraft hook, it would consequently be advantageous to utilize a higher means load in the lines during the first dynamic phase than is utilized during the later phase. Since the loads as stated above during the dynamic phase are to a large extent determined by the total mass of the line, this mass should not be increased but should be proportioned so as to absorb a greater load at the commencement of the arresting sequence and a somewhat smaller load subsequently. A line which permits of utilization in accordance with the concept of the present invention, should therefore be constructed so that the section of the line that is initially unwound will be somewhat stronger than the remaining part of the line. In order to produce the desired effect, the stronger section of the line should be of a length corresponding to not less than one third of the distance between the brakes, since the effect again sharply decreases if the stronger section is made longer than the entire distance between the brakes.

DESCRIPTION

Figure 2:
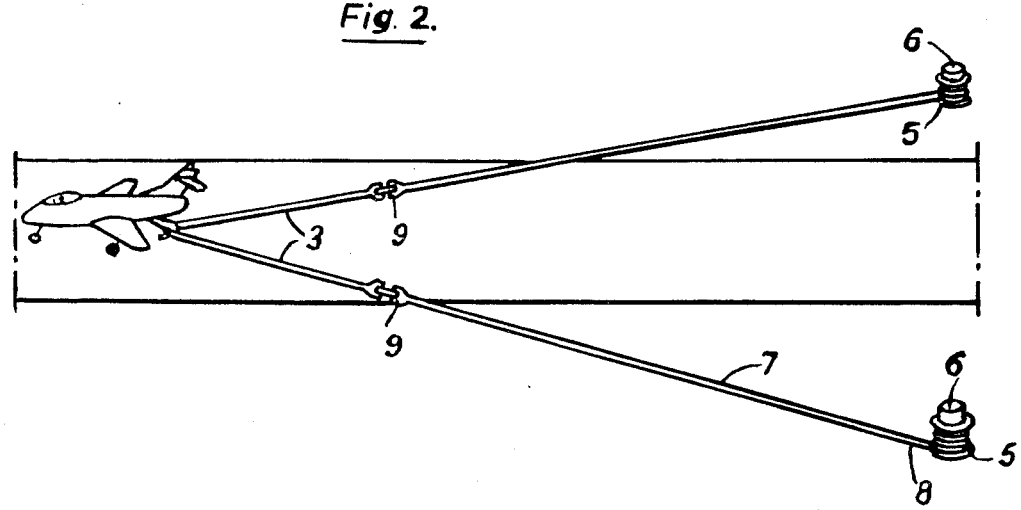

The invention is shown schematically in the accompanying drawing, wherein:

FIG. 1 shows an aircraft and an arresting device at the commencement of an arresting sequence and FIG. 2 shows the same at a somewhat later stage.

In the drawing, a hook 2 is shown on an aircraft 1 and the hook has become engaged with the line of the arresting device. In the present construction, the arrangement includes a line, band or cable 3 stretching across the landing runway. At its ends, the line is attached to braking lines that are wound on braking drums 5 connected to brakes 6. The braking line, band or cable 3 is composed of lengths which are joined together end-to-end and are respectively of different tensile strengths. The stronger section of such line or cable is shown at 7 and the weaker section is shown at 8.

In FIG. 2 the aircraft is shown as being engaged by the line and as having travelled such a distance that the first and stronger section 7 of the braking line is completely unwound and the weaker section shown at 8 has begun to unwind. The stronger section 7 is of greater tensile strength than the weaker section and may be of greater thickness or diameter than the weaker section 8, but this is not necessary. It is possible to alter the density but not the external dimensions, such as by splicing the line with other material or by removing a core and replacing it with hemp or plastic for example. If a section of this line is made of smaller diameter, more space may be gained on the drums. The sections of the cable or line can be joined together in the required end-to-end relationship by means of suitable couplings 9, by being spliced together or strongly united in any other suitable manner.

The invention has been herein described for use in conjunction with brakes having the major portion of the braking line wound on brake drums. However, the concept of the invention is not to be limited to this specific arrangement but may also be utilized under conditions where the braking line is stored in a magazine of some kind before arresting the aircraft.

Strengthening of the line camy be carried out in many ways. For example, it is possible to splice an additional section into the line by hand in addition to existing splices, or a long splice can be used to join a thin line to a thicker one.

What is claimed is:

1. A device for arresting aircraft during roll out on the landing runway comprising:
   a. a pendant extending across the runway for engaging the aircraft;
   b. a first cable portion connected at one end to opposite ends of said pendant having a weight and a tensile strength effective to absorb the kinetic energy during the dynamic phase of the aircraft arresting operation;

c. a second cable portion joined to the other end of said first cable portion having lesser weight and lesser tensile strength than said first cable portion end;

d. an energy absorbing device on opposite sides of the runway from which said cable portions are paid out during the arresting operation.

2. A device according to claim 1 in which the length and the weight of said first cable portion relative to said second cable portion and their respective tensile strengths being so proportioned that the total load on the aircraft during the static phase of the arresting substan-tially equals the sum of the loads on the two cable portions.

3. An arresting device according to claim 2, in which the length of said first cable portion is equal to a distance which is not less than one third and not more than the total distance between said energy absorbing devices.

* * * * *